M. LEVY.
MICROSCOPIC MEASURING MACHINE.
APPLICATION FILED JULY 17, 1917.
1,281,035.
Patented Oct. 8, 1918.
6 SHEETS—SHEET 3.
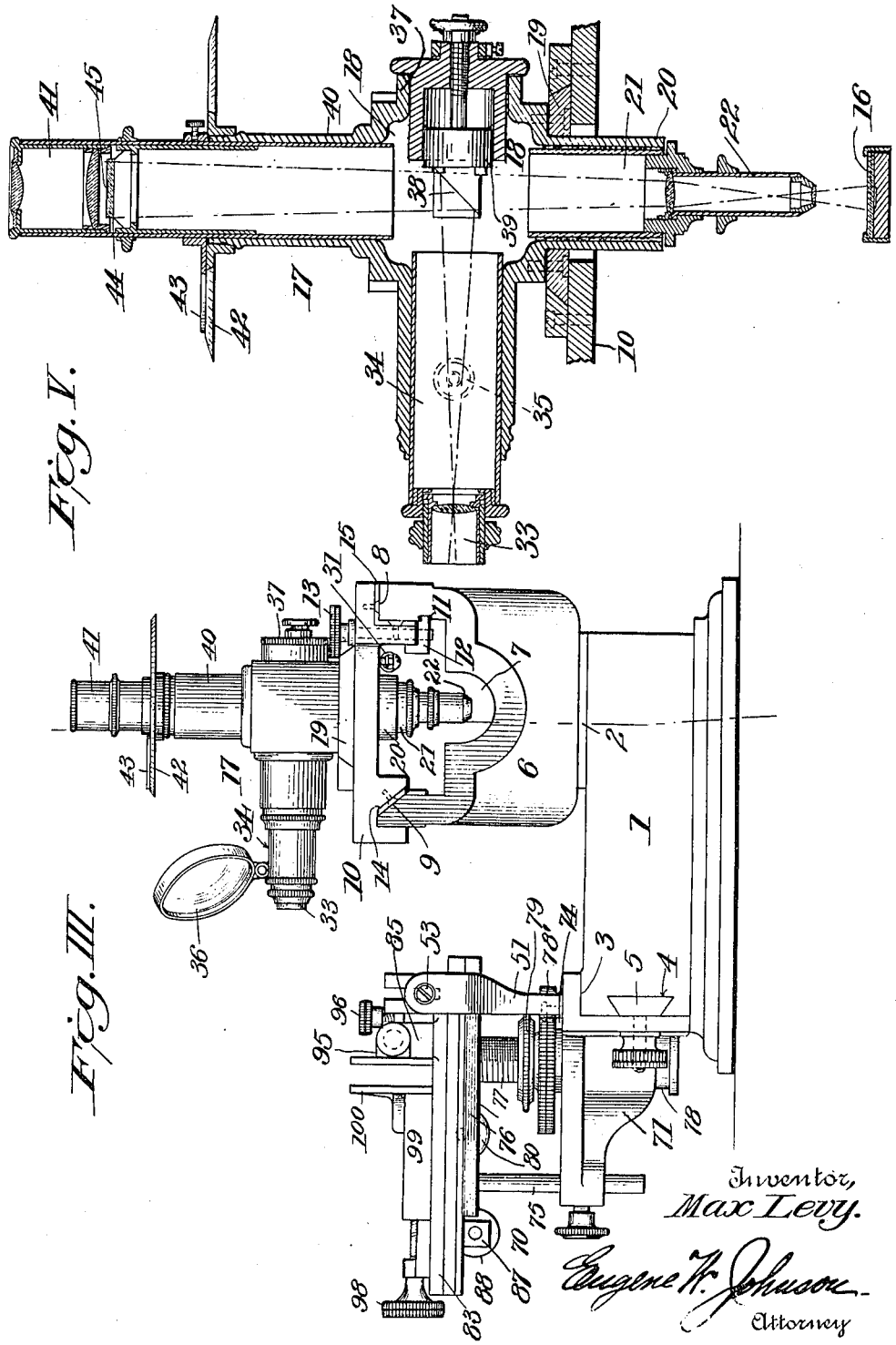
Inventor,
Max Levy.
Eugene W. Johnson
Attorney

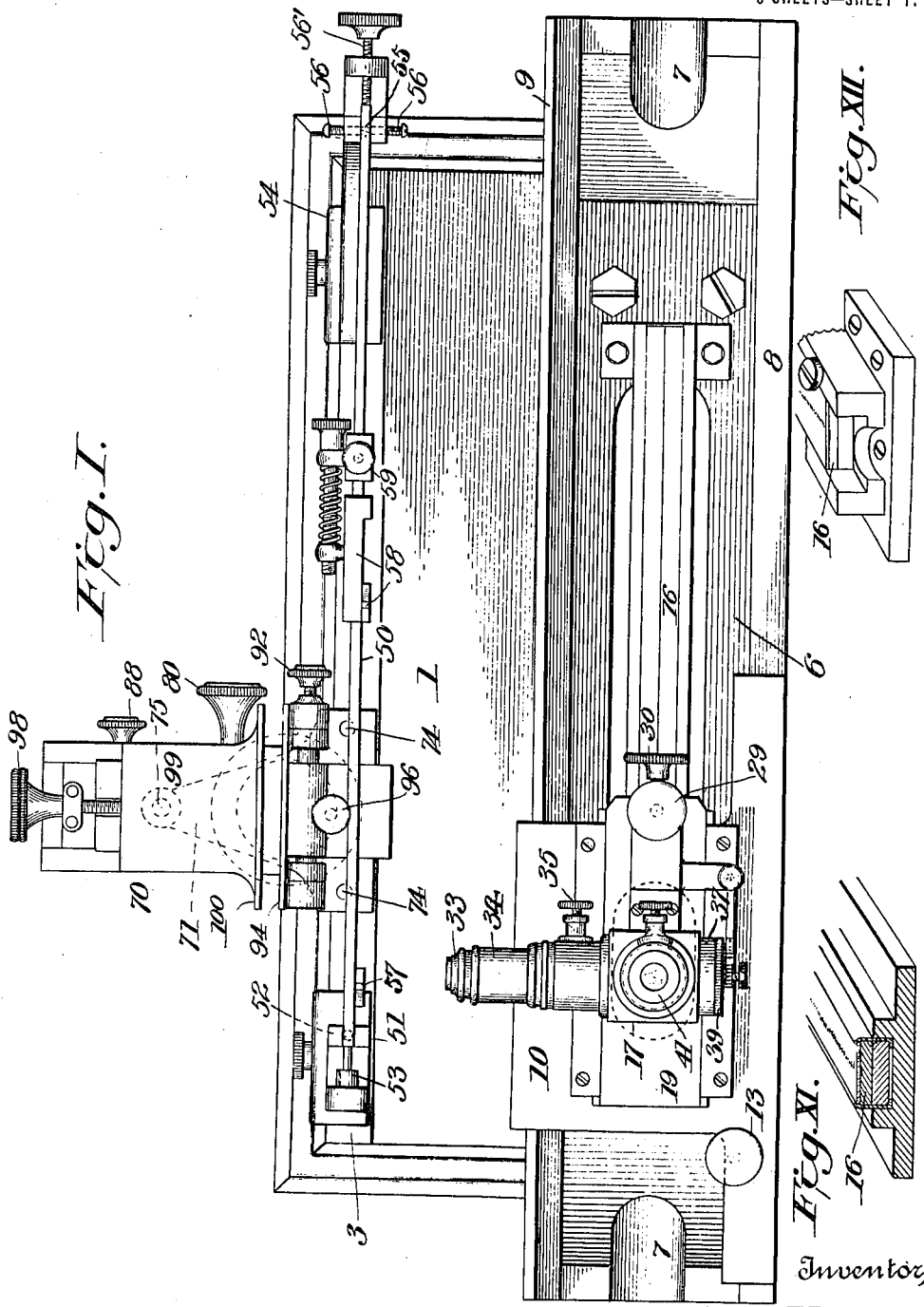

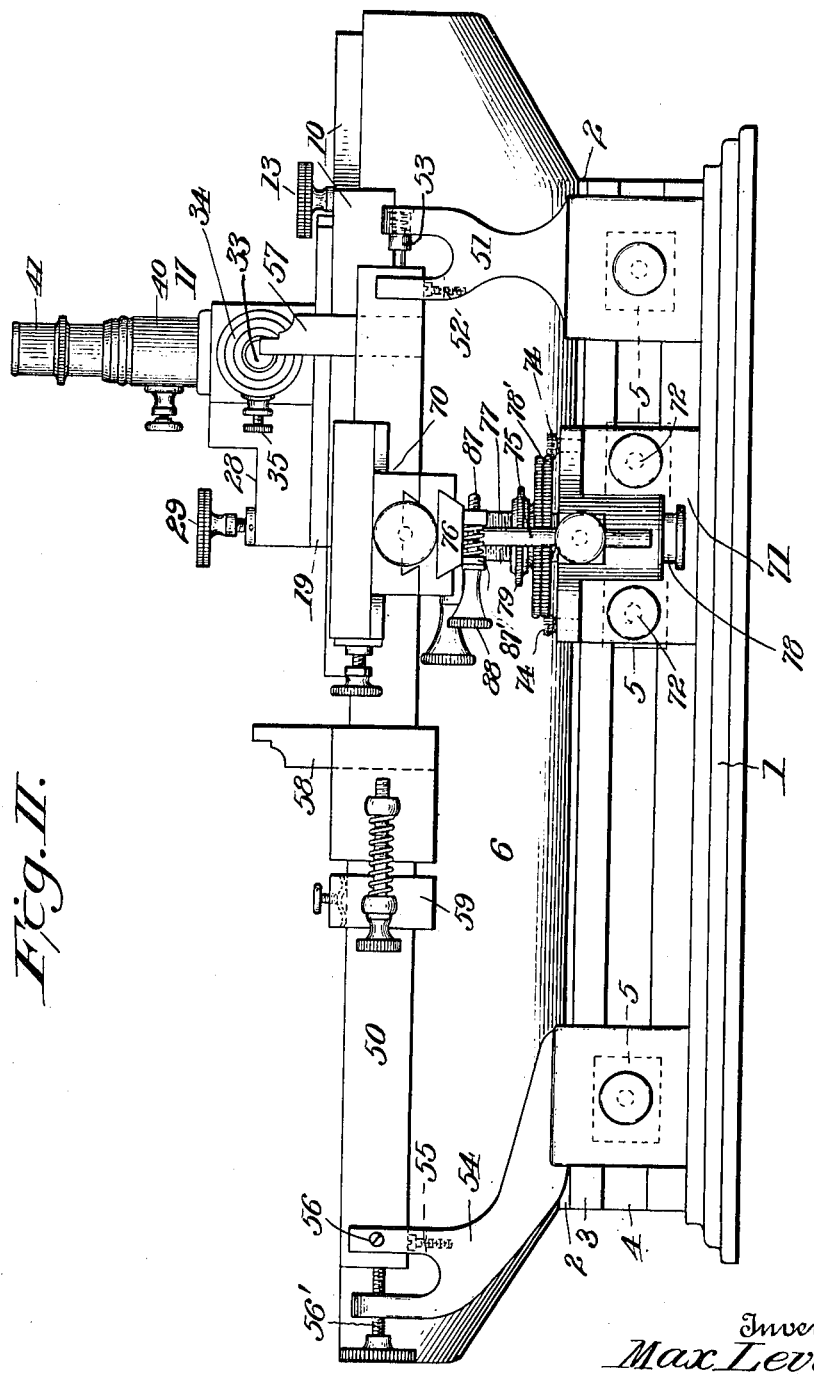

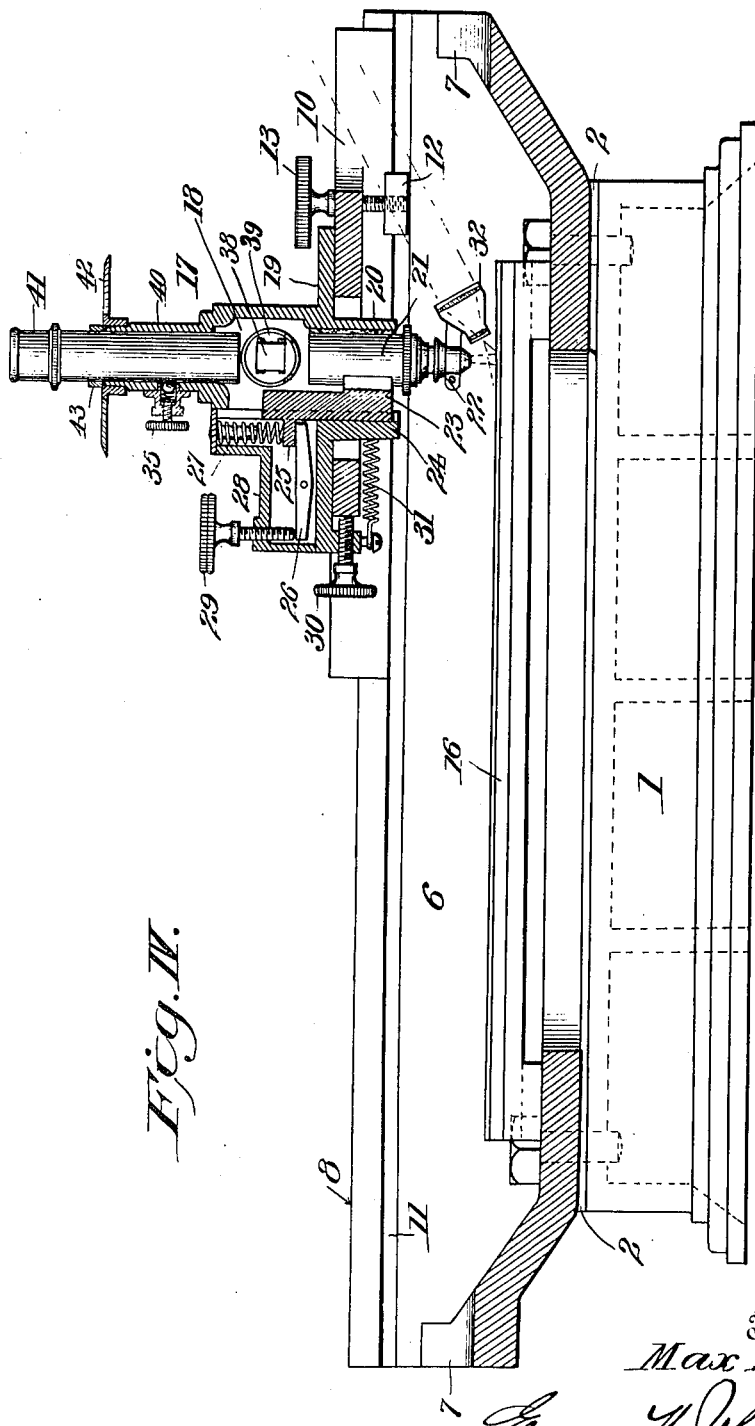

M. LEVY.
MICROSCOPIC MEASURING MACHINE.
APPLICATION FILED JULY 17, 1917.
1,281,035.
Patented Oct. 8, 1918.
6 SHEETS—SHEET 5.
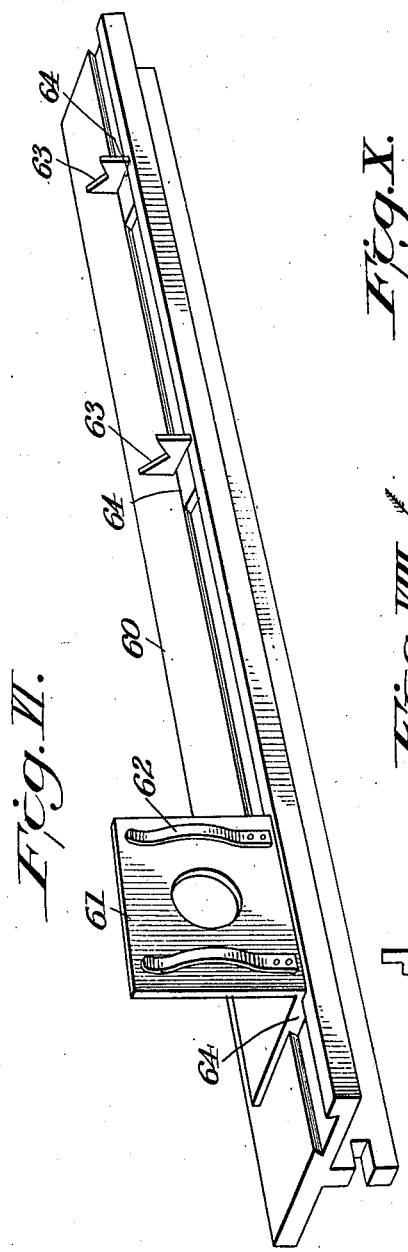
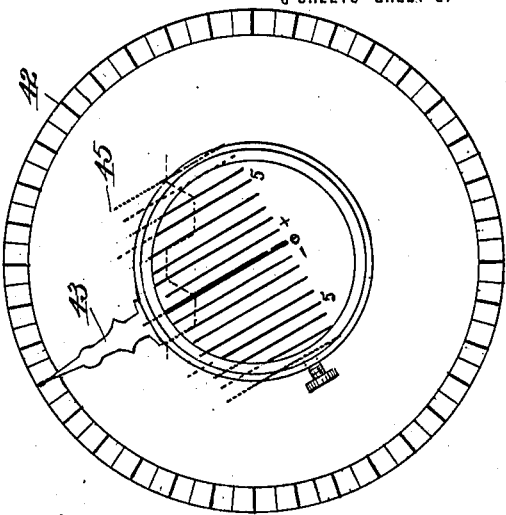
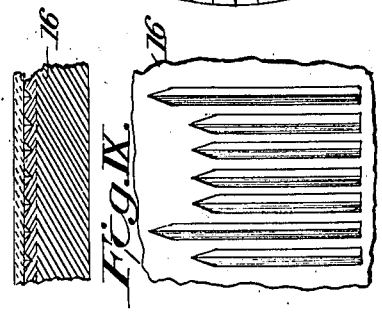
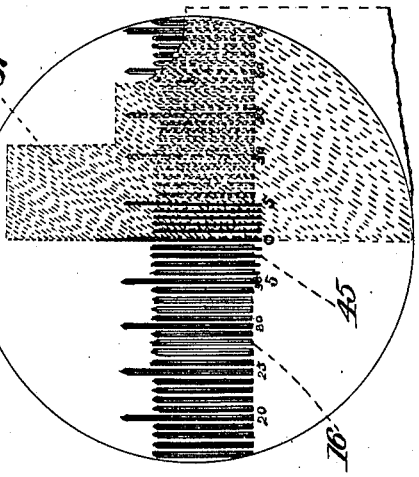
Inventor,
Max Levy.
Eugene W. Johnson
Attorney M. LEVY.
MICROSCOPIC MEASURING MACHINE.
APPLICATION FILED JULY 17, 1917.
1,281,035.
Patented Oct. 8, 1918.
6 SHEETS—SHEET 6.
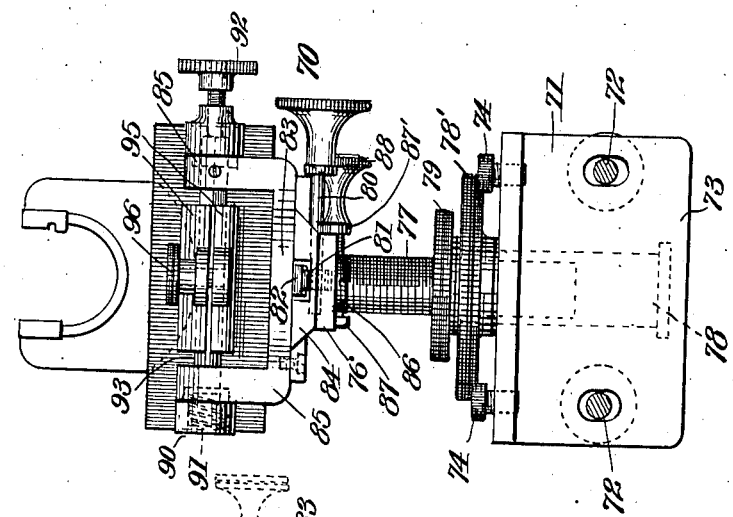
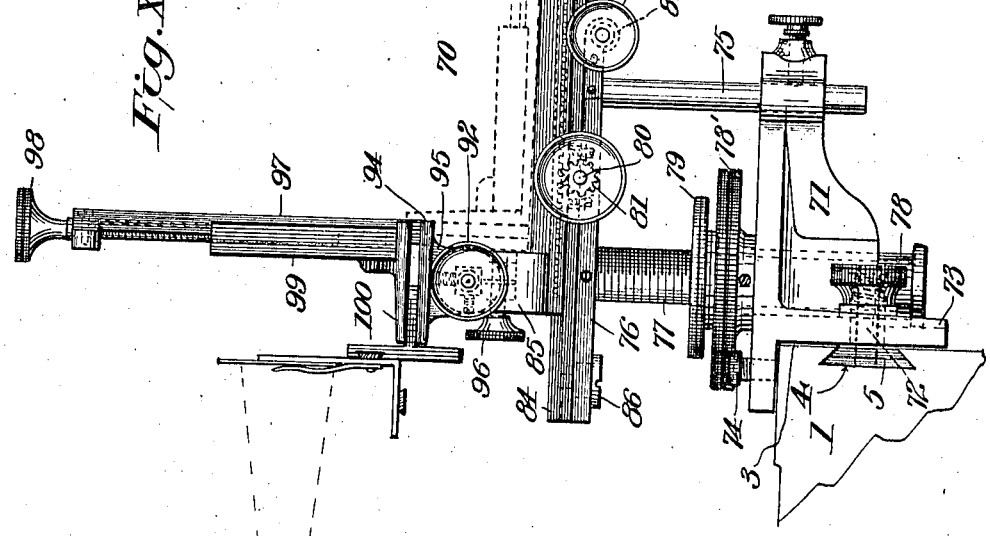
Inventor,
Max Levy.
Eugene H. Johnson
Attorney

UNITED STATES PATENT OFFICE.

MAX LEVY, OF PHILADELPHIA, PENNSYLVANIA.

MICROSCOPIC MEASURING MACHINE.

1,281,035.     Specification of Letters Patent.     Patented Oct. 8, 1918.

Application filed July 17, 1917. Serial No. 181,105.

*To all whom it may concern:*

Be it known that I, MAX LEVY, a citizen of the United States, residing at Philadelphia, in the county of Philadelphia and State of Pennsylvania, have invented certain new and useful Improvements in Microscopic Measuring-Machines, of which the following is a specification.

The microscopic measuring machine that forms the subject matter of this application is designed more particularly for measurement or comparison of pieces, objects, gages and so forth, such as are required in machine shop practice, such machine being applicable to a varied range of precision measurements that may extend from microscopic objects to bars of indefinite length.

A microscopic measuring machine, constructed to accord with my invention, includes supporting means for a scale-bar, a microscope supported above the scale-bar, the microscope having two objectives, one of the objectives being adapted to form a magnified image of the scale-bar, and the other objective the magnified image of the object to be measured, the microscope including means for bringing the images formed by the two objectives simultaneously to a common focus in the field of a single ocular and in certain character of comparisons of an object with the scale-bar, there will be in the focal plane of the ocular means for locating the position of the images formed by the two objectives.

A precision measuring instrument or comparator, made to accord with my invention includes, in its preferred form, a base, to which is attached a frame that supports a scale-bar having microscopic divisions, a microscope having two objectives one being above the scale-bar and the other objective being in line with the object to be measured, such object being supported by a stage attached to the base. The axes of the objectives of the microscope are substantially at right angles, and at or adjacent to the point of intersection of the axes of the objectives there is a prism or reflector, and when the lenses of the objectives are of different power I locate below the ocular a position indicator, filar or the division of a vernier, the arrangement being such that in use the ocular will receive the superposed and magnified images of the object, the scale and the indicator when present. The organization of the parts is such that the superposed images will be clearly distinguished from each other, as the lines on the scale-bar show light on a dark ground, the line or lines of the indicator when present showing dark and partly covering the image of the lines of the scale-bar, and the image of the object or a part thereof showing in shadow over the lines, which lines are visible through the shadow or image of the object.

The invention forming the subject matter of this application also consists in the construction and combination of the parts, whereby a microscope that is provided with two objectives, a reflector or prism and a single objective is maintained, by a suitable base or support, above a microscopic ruled scale-bar maintained in focus with one of the objectives, such base or support also having a stage for an object, which object is maintained in focus with the other objective.

The range of use of a machine in which are embodied the essential features of my invention is not limited to measuring or comparing objects and determining angles, as such a machine may be used with or without the scale-bar, and with or without the position indicator, filar or the division of a vernier, for comparing objects such as spectrum photographs, by optically superposing the images of two such photographs over one another.

The accompanying drawings illustrate a miscropic measuring machine or instrument made to accord with my invention, and in which, Figure I, is a plan view. Fig. II, is a side elevation viewed from the back. Fig. III, is an end elevation. Fig. IV, is a longitudinal section. Fig. V, is a vertical section of the microscope. Fig. VI, is a perspective view of one form of object support. Fig. VII, is a view showing the image of an object and the indicator superposed above the image of the scale. Fig. VIII, is a longitudinal section of a portion of the scale-bar. Fig. IX, is a plan view of a portion of the scale. Fig. X, is a plan view showing the indicator positioned to measure or determine angles. Figs. XI and XII, are perspective views of supports for the scale-bar. Fig. XIII, is a side elevation of one form of a stage for the microscope, and Fig. XIV, is a rear elevation of the stage shown by Fig. XIII.

Referring to the drawings, 1 indicates a base of the box type, the upper side thereof adjacent to the front corners having raised portions 2, and the rear portion 3 has formed therein a longitudinal dovetailed recess 4, for the reception of slides 5. A carriage-support 6, is attached to the base 1, and the support is provided through a part of its bottom wall with a longitudinal opening above which is maintained a scale-bar. The ends of the carriage-support which are inclined upward are provided with recesses 7, 7 and the upper portion of the side walls are shaped to provide tracks or ways 8 and 9, for a slidable platform 10 that carries a microscope. Below one of the tracks or ways the carriage-support has formed therein a groove 11, to receive the end portion of a block 12, said block being engaged by a bolt 13 that is carried by the platform 10, the bolt and block providing means for holding the platform in locked engagement with the carriage-support 6. The platform 10 may be provided with runners 14 and 15, and has through its transverse portion an elongated opening through which is passed the depending objective of the microscope.

The carriage-support 6 is provided beyond the opening therethrough with a carrier or end blocks, see Figs. XI and XII, that maintain a scale-bar 16, the microscopic divisions or lines thereof being at right angles to the line of movement of the microscope, the scale-bar being held so that its rulings will be in line with the depending objective of the microscope.

The divisions or lines of the scale-bar 16, may be spaced so that there will be one thousand lines to the inch, the lines or divisions are angular depressions of about 120°, formed in the plated surface of the scale-bar, and one of the sides of the depressions will be burnished, to render the one half of the lines apparent and brilliant under illumination and magnification.

The microscope 17 is attached to the platform 10 to be longitudinally adjustable thereon, the frame of the microscope having a chamber 18, an attached or integral portion 19 with beveled edges to engage bars attached to the platform 10, a depending portion 20 for the draw-tube 21 of the objective 22, the depending portion 20 being cut away vertically to provide a way for a vertically movable member 23 that is attached to the draw tube and engages a recess in a part 24 of the frame. The member 23 has near its upper end a projection 25, the under side thereof being engaged by a lever 26, and the upper side by a spring 27. The lever and spring are housed within a casing 28 through which passes a screw 29 for adjusting the objective 22. Fine adjustments of the frame of the microscope 17 are made by a screw 30, which is carried by the part 19 and engages an end portion of the platform 10, a spring 31 attached to the parts 10 and 19 acting in conjunction with the screw. The objective 22 is located above the lines of the scale-bar 16 and may be provided with a suitable illuminator or condenser to direct light upon the burnished one half of the rulings on the bar.

The substantially horizontal objective 33, of the microscope is carried by a slide-tube 34 which is maintained in adjustable engagement by a set screw 35 with a rearward extending and tubular member of the frame of the microscope. A reflector or lens 36, for directing light upon an object carried by a stage may be attached to the slide-tube of the objective 33.

In line with the objective 33, the frame of the microscope is provided with an opening to receive a carrier or slide 37 with which is associated a reflector or prism 38. The prism or the reflector 38, is adjustably connected with the carrier by suitable means so that it may be positioned centrally within the chamber and in line with the objectives 22 and 33. The prism or reflector 38, being attached to a frame 39, in such a manner that the prism or reflector may be moved to reflect the image from the objective 33 to the ocular without interfering with the image from the objective 22. The adjusting elements are so organized that the prism or reflector may be turned on its horizontal axis or moved in and out of the axis of the objective 22 and the ocular. The prism 38 may consist of two members to provide a compound prism having an inclosed transparent reflecting surface, as shown by Fig. V.

The vertical member 40 of the frame of the microscope which receives the draw-tube of the ocular 41, has attached thereto a graduated circle 42, and the draw-tube carries a pointer 43.

The eye-piece or ocular 41, maintains a frame that carries a position indicator 44, which may consist of a filar, crossed lines or a disk upon which are ruled microscopic lines 45, that serve as a division of a vernier, the magnified image of the lines being superposed over the lines of the scale-bar 16. The filar, position indicator, or division of a vernier, in use, shows dark, while the image of the scale appears light on a dark background, the reading being apparent by a dark interval in the field of the scale divisions, at the point of coincidence of the scale and of the lines of the vernier or position indicator.

In making measurements or readings of angles, for instance the angles of screw threads, the draw tube having the pointer 43 is turned so that the angle may be read by the position of the pointer over the graduated circle.

It will be noted that the microscope is mounted upon a carriage that is slidable on tracks or ways, and that it is supplied with a fine adjustment for moving the microscope in the same direction that it is movable upon the tracks or ways of the carriage support. The two objectives of the microscope are at right angles and the ocular is in line with the objective that is above the scale-bar, the lines and divisions thereof being at right angles to the line of motion of the microscope. The eye piece or ocular receives the images of the two objectives and the image of the indicator in proper magnification relative to the optical enlargement of the scale, and measurements are made either by direct comparison or by difference in motion.

In conjunction with the microscope and its support I provide a variety of stages, for instance as a support for a bar-caliper 50, the bed 1 will maintain a bracket 51, one member of its forked end being bifurcated and provided with a screw 52, for engagement with the underside of the bar, the outer jaw carrying a spring actuated anvil 53 for engagement with the end of the bar-caliper. The bed is also provided with a bracket 54, the bifurcated end thereof having a vertically maintained adjusting screw 55 and horizontal screws 56, and the outer member of the bracket has a screw 56' for adjusting the caliper-bar longitudinally by pressing its opposite end against the anvil 53.

The caliper-bar 50 has a fixed jaw 57, and a movable jaw 58 which is adjusted by a spring opposed screw that engages a slide 59 that is locked by a screw. The caliper-bar or square is used in making comparisons or measurements either from drawings or objects, as rods and the like.

The brackets 51 and 54 are adapted to carry a flanged bar 60, see Fig. VI, the bar being constructed to maintain object supports, as a slide 61 with spring clips 62 to hold disks, ring-gages, transparent objects, and the like; or the bar may carry other forms of supports as slides 63, to maintain bars, measuring rods or depth gages. The object supports 61 and 63 have projections 64 for engagement with the longitudinal recess in the bar 60.

As an object support I provide a universally adjustable stage 70, which is maintained in slidable engagement with the bed 1 by a bracket 71, that is connected to a slide 5 by bolts 72 which project from the slide and are engaged by clamp-nuts. A horizontal portion of the bracket 71, which overlies the bed is provided with adjusting screws 74, the rear portion of the bracket has a vertical aperture for a rod 75 attached to a bed-plate 76, and said bed-plate also carries a screw 77. The screw 77 engages threads formed in the upper portion of a rotatable tube 78, maintained by the bracket and provided with a milled disk 78' that is fixedly attached to the tube to turn it to raise or lower the platform. The screw 77 is provided with a lock nut 79, and the bracket with a screw for clamping the rod 75 in fixed engagement with the bracket. The bed piece 76 at its forward portion is pivotally connected to a plate 84 by a bolt 86, the plate 84 being swung upon the pivot by a screw 88 that engages a lug 87 having a threaded aperture carried by the plate 84 and a lug 87' on the plate 76, a spring encircling the screw between the lugs, thus by turning the screw 88 the stage may be swung upon the pivot 86. The plate 84 carries in sliding engagement therewith a member 83, that has a rack-bar 82 that is engaged by a pinion 81 attached to a shaft 80 maintained by bearing blocks attached to the plate 84, and by turning the shaft the upper portion of the stage may be moved to and from the objective 33 of the microscope. The member 83 has formed thereon uprights 85, which support a longitudinally movable bar 93, one end of the bar being engaged by a spring 91 that is housed in a cap 90, and the other end by a screw 92. The bar 93 is embraced by projections 95, having lugs for a clamp screw 96, the projections 95 being integral with the jaw 94 that carries an extension 97 and a screw 98 with which is associated the extension 99 of the other jaw 100. The object support or stage 70 may be maintained either in a vertical or in a horizontal position, as shown more particularly by Figs. XIII and XIV.

The invention may be modified as to construction and operation, for instance the microscope may be maintained in a fixed position and the scale-bar and stage will then be movable simultaneously. The machine as illustrated is applicable to a wide range of precision measurements as its construction is such that the microscopic rulings on the scale-bar are focused by adjustment of the objective above the bar and the other objective is focused by its slide tube or by moving the stage.

The device shown may be used for certain purposes, for instance as a comparator, in which instance the objective will be of the same power and for such use the position indicator may be removed.

I claim:—

1. In a comparator or precision measuring instrument, a scale-bar, a microscope provided with two objectives substantially at right angles to each other, one of the objectives being in line with the divisions of the scale-bar, a single ocular for the two objectives, means for bringing the images formed by the objectives simultaneously to a common focus in the field of the ocular and means in the focal plane of the ocular for locating the position of the images formed by the two objectives.

2. In a comparator or precision measuring instrument, a microscope provided with two objectives and an ocular in line with one of the objectives, a scale bar having transverse rulings thereon maintained in line with one of the objectives, and means in the focal plane of the ocular for locating the position of the images formed by the objectives.

3. In an optical micrometer, a microscope having two objectives, a scale maintained in focus with one of the objectives, a stage for maintaining an object in focus with the other objective, an ocular, means for deflecting an image of an object from one of the objectives to the ocular, means in the focal plane of the ocular the magnified image of which coördinates with the magnified image of the scale, the elements being associated so that three images will be superposed in the same field of view.

4. In a microscopic comparator or precision measuring instrument, a microscope provided with two objectives and with an ocular that is provided with a position indicator, a scale maintained in the focus of one of the objectives, a stage for maintaining an object in focus with the other objective and means for maintaining the microscope for movement longitudinally over the scale.

5. In a comparator or precision measuring instrument, a microscope having two objectives and an ocular, a position indicator associated with the ocular, a scale-bar having thereon microscopic rulings, means for maintaining the scale-bar in the focus of one of the objectives, means for maintaining an object in the focus of the other objective and a support for the microscope upon which it is slidable over the scale-bar.

6. In a device of the character set forth for use as a comparator or precision measuring instrument, a support for a microscope, a scale maintained by the support to be in the focus of one of the objectives of the microscope, an object support or stage maintained to hold an object in the focus of the other objective, an ocular with which is associated a position indicator comprising a plurality of lines which with the graduations of the scale constitute a member of a vernier and means for superposing the image of an object over the image of the scale and the image of the member of the vernier in the same field of view as the other two images.

7. In a device of the character set forth, a microscope provided with two objectives which are maintained at right angles one to the other, an ocular in line with one of the objectives, a prism or reflecting surface maintained to direct the image of an object to the ocular, a position indicator comprising lines or filars spaced to be optically coördinated with the microscopic lines of a scale-bar which lines or filars are located between the ocular and the prism or reflecting surface, a bar having a microscopic scale thereon positioned in the focal plane of one of the objectives and means for maintaining an object in the focus of the other objective, whereby three superposed images will be apparent in the same field of view.

8. In a comparator or precision measuring instrument for simultaneously superposing at least three images which will be apparent in the same field of view of a microscope, a microscope having an ocular and an objective in line therewith, a position indicator maintained below the lens or lenses of the ocular, a reflector of a character or position located between the position indicator and the objective so that the image of the object in focus with said objective will be apparent with the image of the position indicator, and another objective from which the image of an object is deflected to the occular, and a microscopic divided scale maintained in the focus of one of the objectives.

9. A microscopic measuring or comparing device comprising a bed, a support that is associated with the bed and having ways, a scale-bar maintained by the support and provided with microscopic divisions which are transverse to the ways, a microscope mounted for movement over the scale-bar said microscope having an ocular and in line therewith, an objective, a second objective which extends at right angles to the aforesaid objective, a compound prism having an inclosed transparent metallic film through which the image of the scale produced by one of the objectives is passed and which film deflects the image produced by the other objective to the ocular, a position indicator maintained by the ocular, and a universally adjustable stage for maintaining an object to be measured or compared in the focus of the second objective.

10. In a microscopic measuring or comparing instrument, a support upon which a microscope having two objectives is maintained to be moved longitudinally thereon, a scale having microscopic rulings thereon maintained by the support to be in the focus of one of the objectives, a second objective that is maintained to be focused upon an object to be measured or compared, an ocular provided with a position indicator the filar or filars thereof being relative to the rulings of the scale to constitute therewith a vernier, means between the objective above the scale and the position indicator for deflecting the image of the object to be measured to the ocular, means for supporting an object having a fixed member and an adjustable member and an adjustable stage for the support thereof.

11. In a device of the character set forth, a base, a universally adjustable stage associated with the base, a frame also associated with the base and provided with upstanding ways, a scale provided with microscopic graduations, a microscope mounted for movement upon the ways of the frame said microscope having two objectives and an ocular, a vernier associated with the ocular to be coördinated with the graduations of the scale, one of the objectives being in line with the ocular, a second objective at right angles to and between the first objective and the ocular and in line with the second objective, a prism or reflector for deflecting the image of an object supported by the stage to the ocular.

12. The combination in a microscopic measuring machine, a scale-bar having microscopic rulings thereon, a microscope comprising two objectives; an ocular in line with one of the objectives and a prism or reflector for directing the image of an object from the objective that is out of line with the ocular to said ocular, a support with which the microscope is maitnained in movable engagement, a stage associated with the support to maintain an object in focus with one of the objectives, means for maintaining the scale-bar in focus with the other objective, substantially as shown whereby the magnified images in focus with the objectives will be superposed when viewed through the ocular.

13. In a device of the character set forth, a support adapted to maintain a microscope in slidable engagement the support having associated therewith a stage for an object and means for maintaining in focus with one of the objectives of the microscope a scale-bar, a microscope having two objectives maintained at right angles one to the other, an ocular in line with one of the objectives, a reflecting surface or prism maintained to direct the image of an object carried by the stage in focus with one of the objectives to the ocular, and a microscopic scale-bar maintained in fixed relation to the support for the microscope and in focus with the other objective; whereby the images of the object carried by the stage and the scale-bar in focus with the objectives will each fully appear to be superposed when viewed through the ocular.

14. In combination with a microscope having an ocular and two objectives maintained at right angles one to the other, a reflector or prism for directing the image of an object to the ocular, a microscopic scale-bar positioned in the focal plane of one of the objectives and means for maintaining an object in the focus of the other objective, the scale-bar having rulings comprising angular depressions one of the sides of each of the depressions constituting a reflecting surface which will be optically more brilliant than the other side of the depressions.

MAX LEVY.